Sept. 10, 1957   M. BESSERMAN   2,805,585
PUSH BUTTON ELECTRICALLY CONTROLLED STEERING ADAPTER
Filed March 12, 1956

INVENTOR.
MAX BESSERMAN
BY
Carl Miller
ATTORNEY

United States Patent Office 2,805,585
Patented Sept. 10, 1957

2,805,585

PUSH BUTTON ELECTRICALLY CONTROLLED STEERING ADAPTER

Max Besserman, Bronx, N. Y.

Application March 12, 1956, Serial No. 570,750

4 Claims. (Cl. 74—625)

This invention relates to steering mechanisms and more particularly, to electrically driven steering devices for vehicles such as automobiles and the like.

The steering of a vehicle, such as an automobile, truck or bus, usually requires a considerable effort on the part of the driver. This is especially true on long trips on turnpikes and highways, and in parking the vehicle in congested areas. The effort required often causes fatigue which is a contributing factor to many tragic accidents. An object of this invention, therefore, is to provide a steering adapter for vehicles which will reduce driver fatigue.

Another object of this invention is to provide an electrically controlled and electrically driven steering mechanism for vehicles that may be energized by the ordinary electrical system of the vehicle.

A further object of this invention is to provide a steering adapter for vehicles that may be selectively engaged and disengaged from operative association with the conventional steering apparatus of the vehicle.

A still further object of this invention is to provide an adapter for the steering apparatus of vehicles that may be removably assembled therewith without affecting the normal operation or arrangement of the parts.

Figure 1:
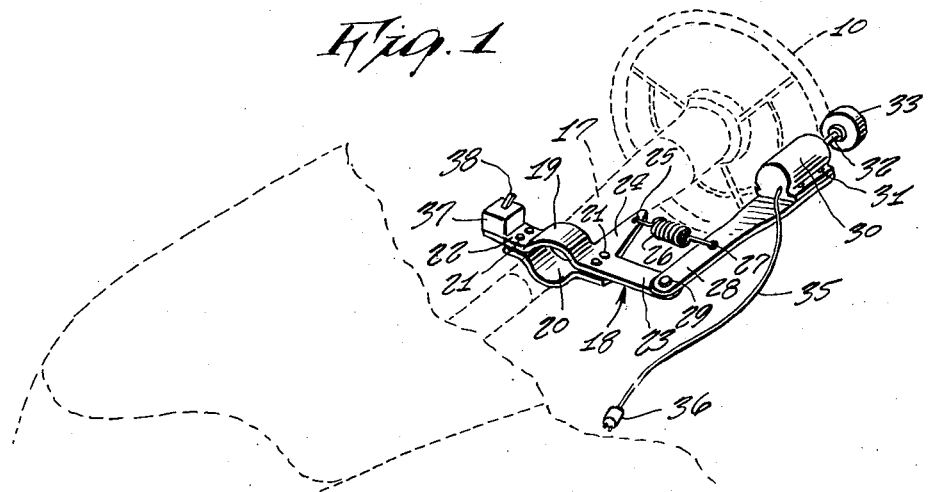
Figure 2:
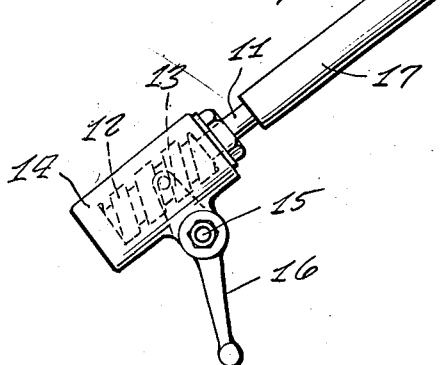

All of the foregoing and still further objects and advantages of this invention will become apparent from a study of the following specification, taken in connection with the accompanying drawings, wherein:

Figure 1 is a perspective view of a steering adapter made in accordance with this invention, shown in conjunction with the conventional steering mechanism of an automobile which is shown in broken lines; and Figure 2 is a side view of the steering adapter and the related steering mechanism shown in Figure 1.

Referring now to Figure 1 of the drawing, an adapter for the steering mechanism of an automobile, in accordance with this invention, is shown in operative association with a steering wheel 10. A feature of the present invention is that the adapter unit may be used in conjunction with any conventional steering mechanism. As shown in Figure 2 of the drawing, the rotation of the steering wheel 10 is transmitted to a worm cam 12 and an associated nut sector 13, which are contained within a steering wheel casing 14, by means of a steering shaft 11. A rock shaft 15 is disposed adjacent to the gear casing and rotatably supports a steering arm 16 that transmits the movement of the nut sector 13 that is secured to one end thereof, to the front wheel axles.

The steering adapter is detachably secured by means of a bracket 18 that is transversely mounted upon the shaft housing 17 that encloses the steering shaft 11, in operative relationship to the steering wheel 10. This bracket includes a centrally disposed arcuate portion 19 that cooperates with a detachable arcuate plate 20 to clampingly engage the housing 17 therebetween by means of a plurality of threaded bolts 21. A pair of wing elements 22, 23 extend outwardly from the central arcuate portion 19. An extension 24 extends upwardly from one wing 23 and has an opening 25 at the outer extremity thereof to receive one end of a tension spring 26. The other end of the spring engages a similar opening 27 which is intermediate the longitudinal extremities of a lever 28 that is pivotally secured at one end to the outer extremity of the one wing 23, by means of a pivot bolt 29. A reversible D. C. motor 30 is secured to the other extremity of the lever 28 by means of a pluraility of bolts 31. Secured to the outer end of the motor shaft 32 is a friction roller 33 that is adapted to drivingly engage the rim of the steering wheel 10 under the action of the spring 26. The motor is supplied with current through a line 35 that has a male plug 36 of the type that may be received in a conventional cigarette lighter socket of an automobile. The supply of current to the motor from the electrical system of the vehicle, which is preferably a 12 volt system, is controlled by a control box 37 and a three-way switch 38.

It will be recognized that with the adapter secured to the steering mechanism in the aforementioned manner, the friction roller 33 is in engagement with the steering wheel, so that the motor is operative to drive the wheel when energized. The switch 38 has a first position to effect rotation of the motor shaft in a first direction, a second position to effect rotation of the motor shaft in a second direction, and a neutral position wherein the motor is de-energized.

By moving the switch 38 from its neutral position to one of its other positions, the motor can be energized to cause rotation of the friction roller in a desired direction, which in turn, will cause rotation of the steering wheel 10. It will, therefore, be recognized that rotation of the steering wheel may be directly controlled by the operation of the switch 38, thereby relieving the driver of the vehicle whenever desired. In the event that it is desired to temporarily disengage the roller 33, the lever 28 may be pivoted about its pivot 29 to an inoperative position. Should it be desired to more permanently disconnect the adapter, it is merely necessary to remove the detachably positioned plate 20, whereupon the original steering arrangement of the vehicle is restored.

While this invention has been described with particular reference to the specific form shown in the drawing, it is to be understood that such showing is for illustration purposes only and is not to be construed as imparting limitations upon the invention, which is best defined by the claims appended hereto.

Having thus described my invention, I claim as new and desire to secure by Letters Patent:

1. The combination with a steering shaft provided with a manually operable steering wheel made fast thereto for its actuation, of motor means that is adapted to rotate said shaft, being selectively operable to directly rotate said shaft in either direction independently of the manual operation of said steering wheel, said motor means comprising a friction roller drivingly associated with said steering wheel, and said shaft is enclosed within a housing and said motor means is pivotally supported on a bracket secured to said housing for selective rotation into and out of engagement with said steering wheel.

2. The combination set forth in claim 1, wherein said bracket includes a centrally disposed arcuate portion that is adapted to clampingly engage said housing, a wing extending outwardly from said arcuate portion and having said motor means pivotally secured to the outer extremity thereof, an extension on said wing intermediate said arcuate portion and said pivotal connection, and a tension spring connected between said extension and said pivotally supported motor means.

3. The combination set forth in claim 2, wherein said motor means comprises an electric motor, and said bracket comprises a second wing extending in an opposite direction than said first wing from said arcuate portion, and manually operable control means for said motor mounted on said second wing.

4. The combination as set forth in claim 3, wherein said manually operable control means comprises a three-way switch electrically connected between said motor and a source of electrical supply, said switch being operative to selectively effect rotation of said motor means in a first direction, a second direction, and to deenergize said motor.

References Cited in the file of this patent
UNITED STATES PATENTS

| | | |
|---|---|---|
| 783,007 | Allen | Feb. 21, 1905 |
| 1,473,634 | Loudon | Nov. 13, 1923 |
| 1,681,487 | Lee | Aug. 21, 1928 |
| 1,734,419 | Chitty | Nov. 5, 1929 |